United States Patent [19]

Purdy et al.

[11] 4,193,516
[45] Mar. 18, 1980

[54] LIQUID PROPORTIONER FOR MIXING TWO LIQUIDS IN A PREDETERMINED RATIO

[75] Inventors: Chester A. Purdy; George A. Purdy, both of Belmont, Wis.

[73] Assignee: Purdy Proportioners, Ltd., Belmont, Wis.

[21] Appl. No.: 809,456

[22] Filed: Jun. 23, 1977

[51] Int. Cl.² ............................................. B54D 35/22
[52] U.S. Cl. ........................................ 222/57; 222/67; 222/94; 222/547; 366/152; 366/162; 366/178
[58] Field of Search ..................... 222/57, 66, 67, 72, 222/94, 129.2, 133, 134, 145, 547, 564, 95, 386.5; 138/42, 49; 137/111, 114, 399, 604, 605; 366/152, 162, 178; 141/105

[56] References Cited

U.S. PATENT DOCUMENTS

| 1,014,048 | 1/1912 | Byers | 222/57 X |
| 1,699,297 | 1/1929 | Ledbetter | 138/44 |
| 3,194,434 | 7/1965 | Evanson | 222/67 X |
| 3,406,870 | 10/1968 | Arneson | 222/67 X |
| 3,799,402 | 3/1974 | Meister et al. | 222/129.2 |
| 3,809,291 | 5/1974 | Purdy | 222/386.5 X |

*Primary Examiner*—Robert J. Spar
*Assistant Examiner*—Fred A. Silverberg
*Attorney, Agent, or Firm*—Pearne, Gordon, Sessions

[57] ABSTRACT

A liquid proportioner is disclosed which is particularly adapted for mixing medicaments or the like in the drinking water supplied to animals. The proportioner provides two separated chambers one of which contains medicament and the other which contains water. An orifice system connects each chamber to a mixing chamber. The first orifice system includes a plurality of parallel connected orifices connecting the water chamber and the mixing chamber. The second system includes a plurality of series connected orifices connecting the medicament chamber and the mixing chamber. The two liquids are maintained at substantially the same pressure. In the illustrated embodiment all of the orifices are the same size and the series connected orifice system has a hydrodynamic flow value which is substantially smaller than the hydrodynamic flow value of each of the parallel connected orifices. With such system accuracy of proportioning flow is maintained over substantial ranges of flow and is maintained at low flow rates even when the specific gravity of the medicament is substantially greater than the specific gravity of water. A ball valve operates to close off the medicament orifice system under no flow conditions. Such valve is opened in response to water flow and is operable to re-establish proper proportioning flow even at extremely low proportioner flow rates.

20 Claims, 3 Drawing Figures

LIQUID PROPORTIONER FOR MIXING TWO LIQUIDS IN A PREDETERMINED RATIO

BACKGROUND OF THE INVENTION

This invention relates generally to systems for mixing liquids and more particularly to an improved liquid proportioner for mixing two liquids, which proportioner is suitable for dispensing a medicament water mixture for animals in which the medicament is diluted to a predetermined concentration.

PRIOR ART

Various systems are known for mixing liquids. Examples of such systems are described in U.S. Pat. Nos. 2,618,510; 3,084,712; 3,281,123; 3,423,073; 3,540,623; and 3,809,291. The U.S. Pat. No. 3,809,291 to Purdy issued May 7, 1974 describes a liquid proportioner having two separate chambers, one of which is supplied with drinking water and the other of which is supplied with another liquid which is added to the drinking water. Such other liquid may be any concentrate which is to be diluted, and, for example, may be a nutrient or a medicament. The concentrate is hereinafter generally referred to as a medicament with the understanding that such term is intended to include substantially any other type of concentrate.

Such proportioner provides two separated chambers. The medicament is located within a flexible bag or flexible chamber immersed in the water in the water chamber so that the two liquids are maintained at the same pressure. Located below the two chambers is a mixing chamber communicating with water chambers through a plurality of first orifices and communicating with the medicament chamber through a single second orifice. In accordance with such patent, all of the orifices are hydrodynamically identical and the number of first orifices exceeds the number of second orifices by a ratio equal to the desired mixing ratio of water to medicament. For example, when it is desired to dilute the water and medicament at a ratio of 100 to 1 there are 100 similar orifices connecting the mixing chamber and the water chamber and a single orifice connecting the mixing chamber and the medicament chamber.

The proportioner of such patent accurately and simply mixes the two liquids in the desired proportions or ratios under normal operating conditions, however, if the supply of water is depleted for any reason, the medicament concentration can become excessive. In the pending application Ser. No. 663,513, filed Mar. 3, 1976 (now abandoned in favor of a CIP application, Ser. No. 813,535, filed July 7, 1977) an improved structure is described which overcomes this problem. Such improved structure provides a valving system which closes off medicament flow if the supply of water is depleted.

Difficulties are sometimes encountered even with the improved system of such application under certain operating conditions. For example, when the flow rate through the proportioner is extremely low the accuracy of proportioning may deteriorate to some extent. This is particularly true under very low flow rates when the specific gravity of the medicament is substantially different than the specific gravity of water. Such very low flow rates may, for example, occur when only a few animals are being supplied or when the proportioner is used to supply medicated drinking water for small animals such as chickens. It is believed that such inaccuracy in proportioning may occur at very low flow rates because of very small differences in pressures across the two orifice system created by the differences in specific gravity of the two liquids or may occur because the flow rates through each orifice is extremely small and in a region of non-linear metering.

Another problem can occur when no demand for flow exists for a period of time, particularly when the specific gravity of the medicament is significantly higher than the specific gravity of the water. In such instance, during no flow conditions, a medicament with a heavier specific gravity can flow through its orifice and displace water or mixture back through the water control orifices from the mixing chamber to the water chamber and thereby establish an excessive concentration of medicament in the mixing chamber. If flow is then re-established the highly concentrated mixture contained within the mixing chamber is carried to the drinking location ahead of the proper mixture produced during normal flow conditions. When the specific gravity of the medicament is essentially equal to the specific gravity of water the opposite problem can occur during conditions of no proportioner flow. Under such circumstances water sometimes migrates up into the medicament chamber when the medicament chamber is partially full.

SUMMARY OF THE INVENTION

There are several aspects to the present invention. In accordance with one important aspect of the invention an improved orifice system is provided which produces improved accuracy of proportioning even when very low flow rates are encountered while mixing two liquids of substantially different specific gravity.

In the illustrated embodiment the orifice system for the medicament is provided with a plurality of metering orifices connected in series between the medicament chamber and the mixing chamber. The orifice system connecting the water chamber and the mixing chamber includes a plurality of orifices connected in parallel between the two chambers. By arranging the medicament orifices in series the resistance to flow of the resulting orifice system is increased and the series connected orifice system is the hydrodynamic equivalent of a single orifice of substantially smaller size than the size of each of the orifices in the series connected system. Consequently, the number of parallel connected water orifices can be reduced while maintaining a predetermined proportioning ratio.

In the illustrated embodiment it has been determined by tests that a proportioning ratio of 100 to 1 may be obtained when all of the orifices are the same size and 16 medicament orifices are provided in series with about 16 to 20 water orifices connected in parallel. In such system each of the water orifices has a hydrodynamic flow value about 5 to 6.25 as great as the hydrodynamic flow value of the series connected medicament orifices. Further, the tests have established that the accuracy of proportioning obtained at substantial flow rates is also maintained at very low flow rates even when mixing two liquids of substantially different specific gravities.

In accordance with another important aspect of this invention a valving system is provided to positively prevent medicament flow when there is no demand on the proportioner for extended periods of time even when the specific gravity of the medicament substantially exceeds the specific gravity of the water. Such valving system is arranged to be opened, however, for normal proportioning flow even when very low rates of flow are required from the proportioner. In the illustrated embodiment a ball valve having a density or specific gravity less than the specific gravity of the mixture is positioned with a relatively close fit within a tubular extension in alignment with the outlet of the medicament orifice system. Under no flow conditions the ball valve floats up against the outlet of the medicament orifice system and closes it off to prevent flow through the medicament orifice system in either direction. The structure, however, is arranged so that all flow through the proportioner enters the tubular extension above the ball valve and functions even under very low flow conditions to move the ball valve to an open position.

These and other aspects of this invention are more fully described in the following description and drawings.

DETAILED DESCRIPTION OF THE DRAWINGS

Figure 1:
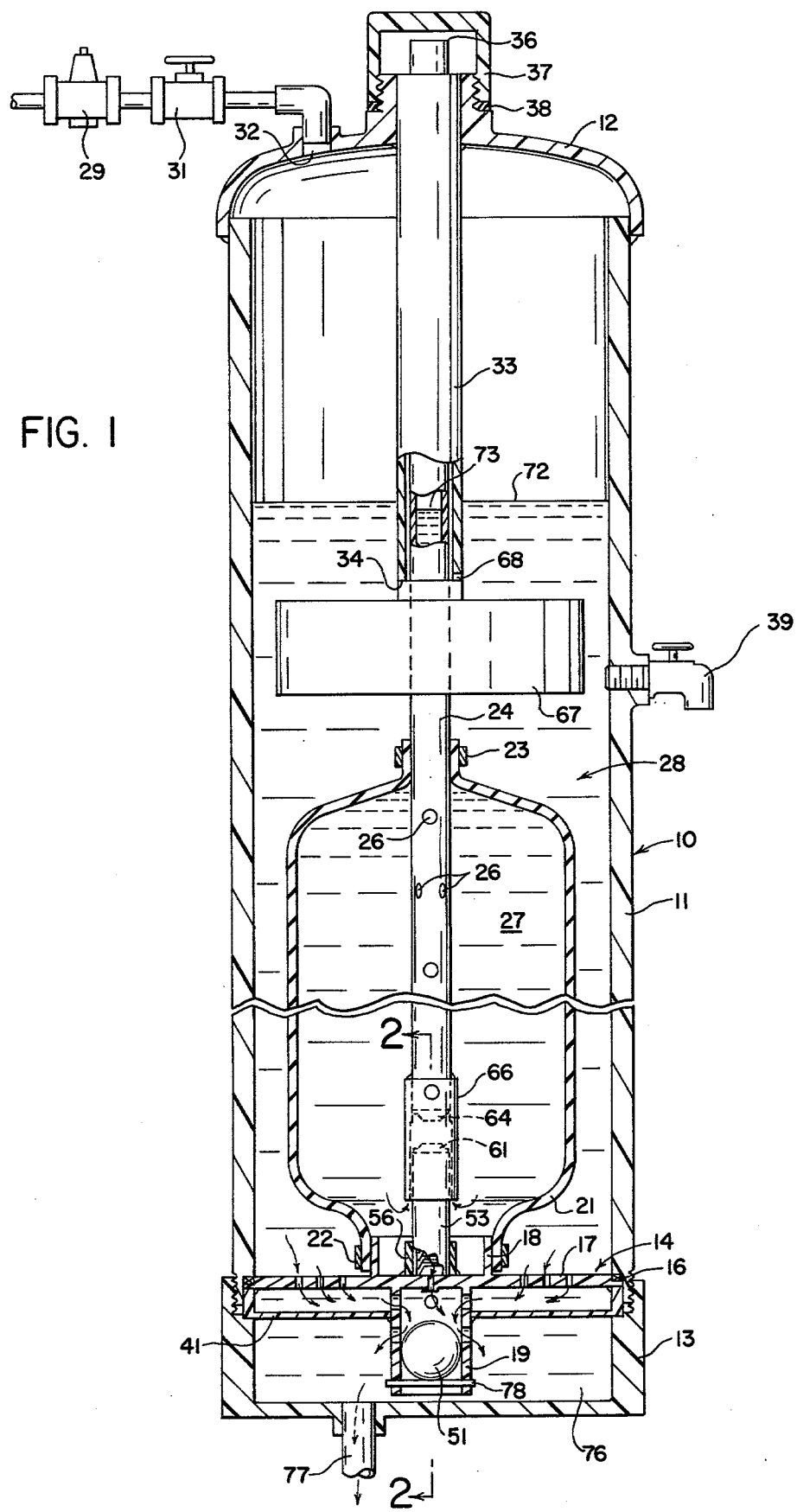
FIG. 1 is a side elevation generally in longitudinal section illustrating a preferred embodiment of this invention and illustrating the various components of the system in their normal position for proportioning flow.

FIG. 1 illustrates the overall proportioner incorporated in the present invention. In FIG. 1, however, the proportioner is illustrated in a broken section for purposes of illustration and it should be understood that the length of the proportioner which includes the flexible bag is considerably longer than is illustrated in the drawing.

The proportioner includes a housing assembly or tank 10 consisting of a cylindrical housing 11 closed at its upper end by an end cap 12 and at its lower end by a cup shaped end cap 13. Preferably, the tank 10 is formed of a reinforced plastic material such as fiberglass or the like which does not corrode.

Mounted at the lower end of the cylindrical housing 11 is an orifice assembly 14 which is secured in position when the end cap 13 is threaded onto the lower end of the housing assembly 11. A gasket or seal 16 may be provided to prevent leakage around the orifice assembly 14.

The orifice assembly 14 includes an orifice plate 17 providing an upwardly extending centrally located flange 18 and a downwardly extending centrally located flange providing a tubular valve guide 19. A flexible bag 21 is clamped around the flange 18 with a clamping band 22 so that the lower end of the bag forms the fluid tight joint with the flange 18. Similarly the upper end of the bag is clamped by a clamping band 23 to the outer surface of a filler tube 24 which extends axially along the housing 11. The filler tube 24 is formed with a plurality of lateral ports 26 which provide communication between the interior of the tube and a medicament chamber 27 within the bag 21.

A water chamber 28 is provided within the tank 10 outside the flexible bag 21. The proportioner is supplied with water in any convenient manner. Usually, the water chamber 28 is connected to a suitable source of drinking water under pressure through a pressure regulator 29, a shut-off valve 31 and an inlet port 32 in the upper end cap 12. A tube 33 is mounted in the end cap 12 and extends downwardly along the axis of the tank to an open end at 34. The filler tube 24 extends up along the interior of the tube 33 to its upper end at 36 so that medicament can be added to the medicament chamber 27 when the supply of medicament is depleted. A cap 37 is threaded onto the end cap 12 and is provided with a gasket 38 so that the unit is sealed when the cap is in place.

A drain valve 39 is mounted in the sidewall of the cylindrical housing 11 and is opened to relieve the pressure within the tank when it is necessary to refill the proportioner with additional medicament. At such time the shut-off valve 31 is closed so that the drain valve can be utilized to relieve the pressure within the tank and also to lower the water lever within the tank to the level approximately in the alignment with the lower end of the float 67. After the bag has been filled with medicament through the filler tube the drain valve 39 is closed and the shut-off valve 31 is opened to return the system to normal operation.

Figure 2:
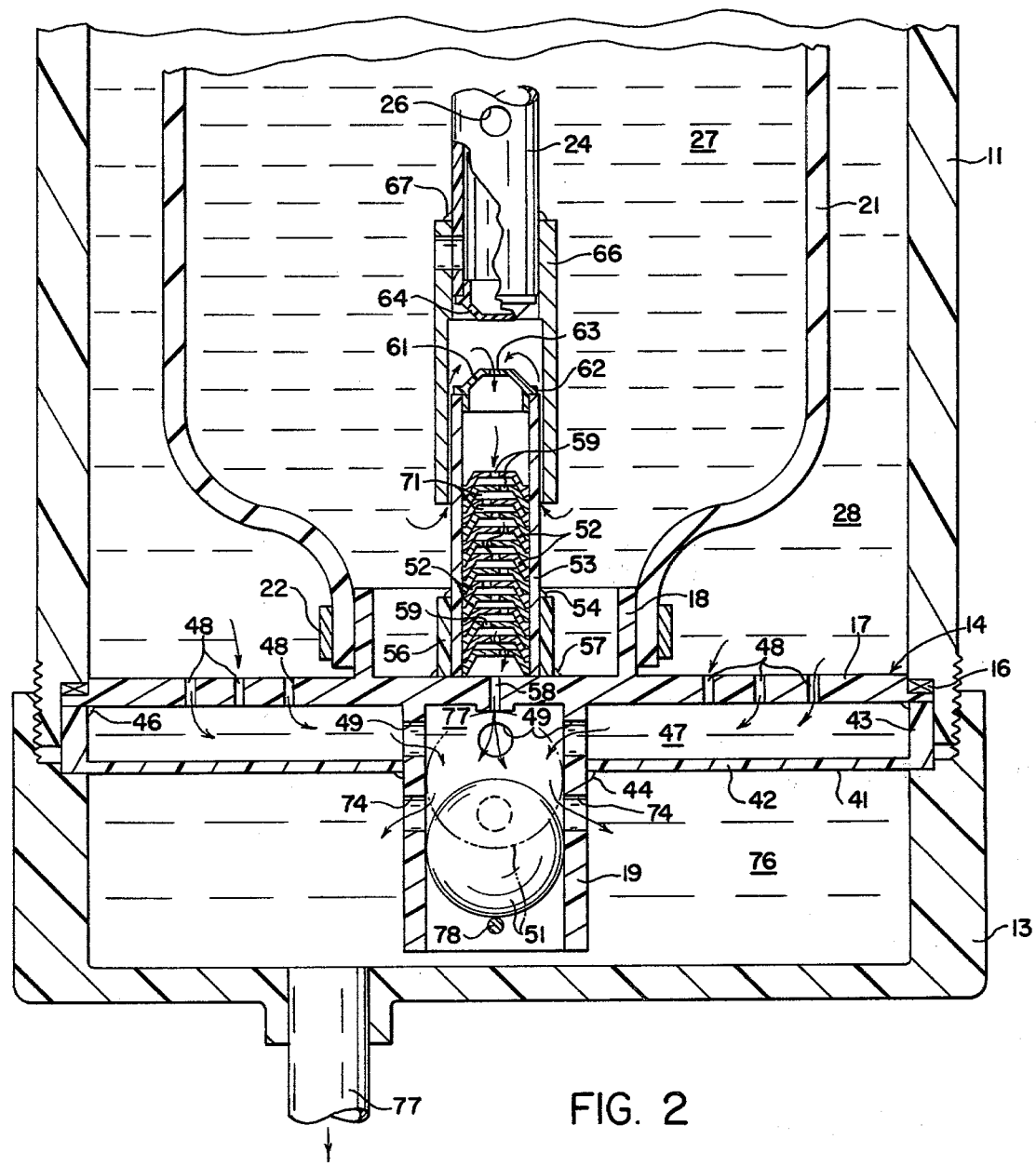
FIG. 2 is an enlarged fragmentary longitudinal section illustrating the structural detail at the lower end of the proportioner with the ball valve illustrated in full line in its open position for normal proportioning flow and in phantom in its closed position.

FIG. 2 illustrates the structural detail of the orifice assembly 14. The orifice assembly 14 in addition to the orifice plate 17 includes a shallow cup shaped member 41 providing a centrally apertured bottom wall 42 and an upstanding flange 43 which are sealed by a suitable adhesive or the like at 44 and 46. The cup shaped member in cooperation with the orifice plate defines an annular chamber 47 below the orifice plate and around the tubular valve guide 19.

An orifice system for the water includes a plurality of similar orifices 48 connecting the water chamber 28 and the annular chamber 47 so that all of the water flowing through the water orifices 48 passes into the annular chamber 47. From the chamber 47 the water passes through one of a plurality of ports 49 into the interior of the valve guide 19 on the upper side of a spherical float valve 51. The location of the ports 49 is such that the water flow is directed into the valve guide 19 above the mid-plane of the valve 51 even when the valve 51 is in the closed position illustrated in phantom.

A series connected orifice system is provided for medicament flow. Such orifice system includes a plurality of separate orifice members 52 positioned as a stack within a tubular member 53 which is cemented at 54 in the upstanding cylindrical flange 56. The flange 56 may be cemented at 57 to the upper side of the orifice plate 17 or may be integrally molded into the orifice plate as desired.

The orifice plate 17 is also provided with a centrally located orifice 58 which constitutes the downstream or bottommost orifice of the medicament orifice system.

Each of the orifice members 52 is preferably molded with a sidewall shaped generally as a truncated cone and an end wall formed with an orifice 59 therein and is shaped so that a plurality of orifice members 52 can be pressed into the tube 53 with each of the orifices of each orifice member spaced from the orifice of the adjacent member and with the periphery of the orifice member 52 sealed against the inner wall of the tube 53. As best illustrated in FIG. 2 the orifices 59 are preferably randomly located in the orifice members 52 so that each orifice 52 is offset to some extent from the orifice on either side thereof.

The upstream or uppermost orifice of the medicament orifice system is provided by an orifice member 61 which is generally the same shape as the orifice members 52 but is provided with a flange 62 to maintain it in proper position at the end of the tube 53. Here, again the orifice member 61 is provided with an orifice 63.

The lower end of the filler tube 24 is blocked by a cap member 64 having a shape substantially the same as the shape of the orifice member 61 but provided with an imperforate end wall rather than an orifice so that the cap member 64 serves to close off the lower end of the filler tube 24 and can function as a valve member as described below.

Positioned around the end of the filler tube 24 is a tubular extension 66 which is cemented at 67, or otherwise suitably secured to the lower end of the filler tube 24 and is proportioned to fit over the tube 53 with a loose fit so that medicament can flow up from the medicament chamber 27 between the tubes 53 and 66 and into the medicament orifice system.

Referring again to FIG. 1, a float 67 is mounted on the filler tube 24 within the water chamber 28 and functions to lift the filler tube 24 to the position illustrated whenever a sufficient supply of water is contained within the water chamber 28. The float 67 is located along the length of the filler tube 24 so that it engages the end 34 of the tube 33 when the filler tube has been raised sufficiently to provide a spacing between the closure member 64 and the uppermost orifice member 61 so that medicament can flow through the medicament orifice system during normal operation. The various elements are proportioned, however, so that the end of the tube 66 remains over the upper end of the tube 53 when the float 67 engages the end 34 of the tube 33 to insure that the two tubes 66 and 53 remain in their telescoping relationship. This insures that the tube 53 laterally locates the lower end of the filler tube 24.

Whenever the supply of water within the water chamber 28 is depleted for any reason the level of the water within the chamber 28 drops down until the float 67 is no longer immersed and the weight of the float and the filler tube 24 causes the filler tube to drop down until the member 64 engages the uppermost orifice member 61 closing off the orifice 59 and preventing further medicament flow through the medicament orifice system. This insures that the medicament will not continue to flow when the source of water is depleted and prevents the proportioner from supplying medicament at excessive concentrations under such circumstances. Reference should be made to the copending application Ser. No. 663,513 (now abandoned in favor of a c-i-p application, Ser. No. 813,535, filed July 7, 1977 referred to above which application is directed to this broad feature of this proportioner.

Figure 3:
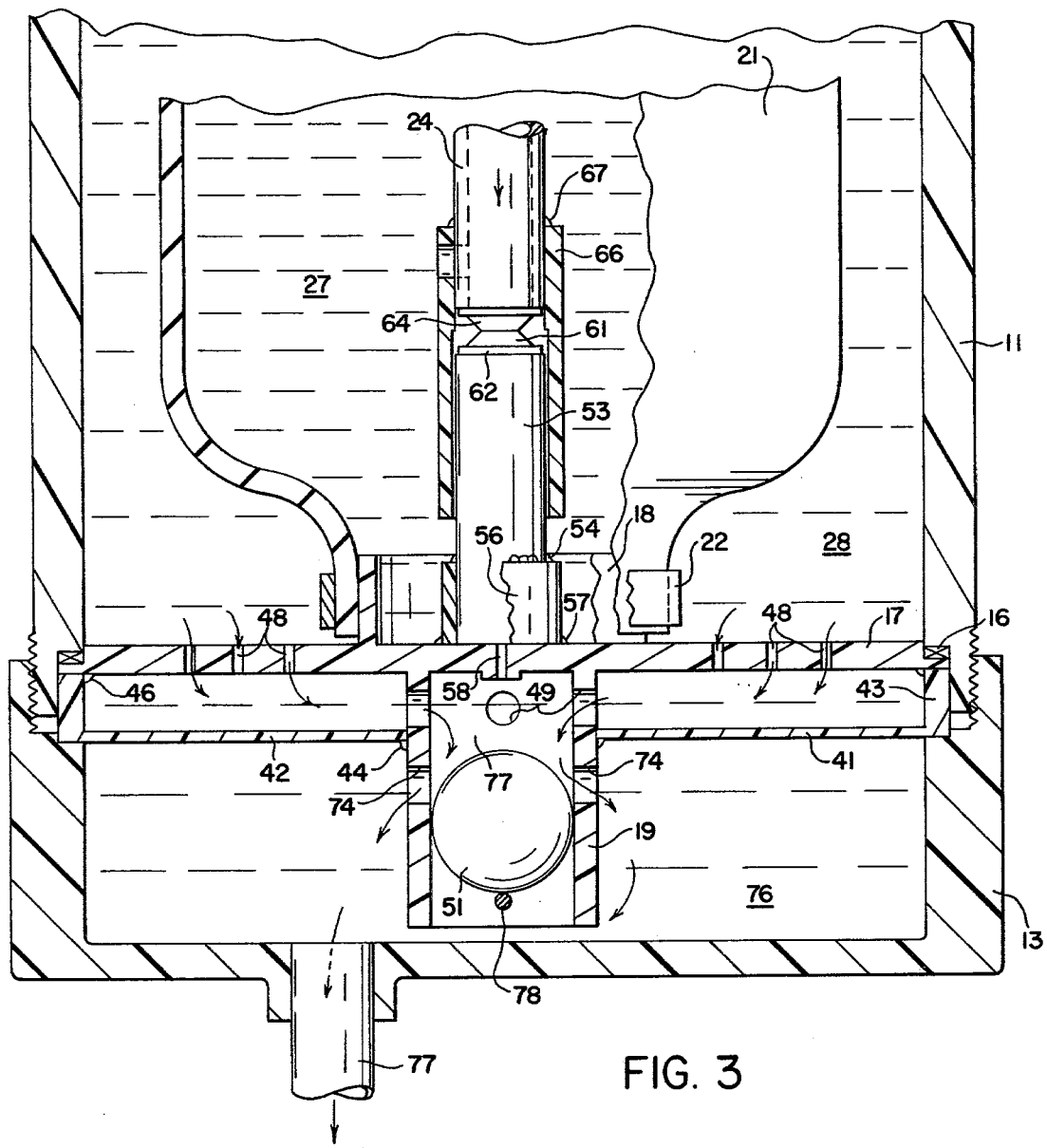
FIG. 3 is an enlarged fragmentary longitudinal section similar to FIG. 2 but illustrating the system in a condition which occurs when insufficient water is present and medicament flow is shut off.

FIG. 3 illustrates the structure when medicament flow is terminated in response to a depletion of water within the water chamber 28. It should be noted that water continues to flow under such condition until the entire supply of water is exhausted but this does not produce a dangerous situation because the water supplied, as the proportioner is drained down, is not harmful.

The end 34 of the tube 33 is preferably formed with lateral notches 68 which insure communication between the interior of the tube 33 around the filler tube 24 and the upper portion of the water chamber 28 even when the float 67 is in the fully raised position illustrated in FIG. 1. The tube 33 prevents loss of the pocket of air which is formed within the tank each time the drain valve is opened and a new supply of medicament is poured into the medicament chamber through the filler tube 24. This function is more fully described in such copending application.

In the illustrated embodiment all of the orifices 58, 59, and 63 which are series connected and constitute the medicament orifice system have the same diameter and the diameter equal to the diameter of the parallel connected orifices 48. In the illustrated embodiment the proportioner is arranged to mix water with medicament to provide a hundred to one mixing ratio. In such embodiment tests have indicated that good operation is obtained when 16 orifices are connected in series in the medicament orifice system and about 16 to 20 parallel connected orifices are provided in the water orifice system, and wherein the diameter of all of the orifices of both systems are the same. The orifices in a test unit were 1/16 inch in diameter and there were sixteen orifices in each system. These tests have established that accurate proportioning is achieved even over a range of proportioner flow from twenty ounces per minute to one hundred and ninety ounces per minute. It is believed that good proportioning accuracy is obtained at even substantially lower flow rates. In fact, good accuracy is maintained at low flow rates even when the specific gravity of the medicament exceeds the specific gravity of the water by a substantial amount. For example, good metering accuracy is achieved when the medicament has a specific gravity in the order of 1.05.

Normally, when two or more orifices are connected in series the total resistance to flow of the series system is equal to the square root of the sum of the squares of the resistance of each orifice. When the resistance of each orifice in the series connected system is equal to the resistance of the other orifices in the system the total resistance of the system can be determined by the formula $$L_t = L\sqrt{N}$$

Where;
$L_t$ = the total resistance of the series connected system.
L = the resistance of each orifice.
N = the number of orifices in the system.

From the above formula it would appear that the resistance to flow of the medicament orifice system containing sixteen orifices of similar diameter should be equal to the square root of sixteen times the resistance of each of the series connected orifices or $L_t$ of the series connected orifice system should equal four times the resistance of each of the orifices within the system. Since the diameter of each of the water orifices 48, in the illustrated embodiment, is the same as the diameter of the orifices 58, 59 and 63 within the medicament orifice system it would appear that a mixing ratio of 100 to 1 would require twenty-five orifices when sixteen medicament orifices are connected in series.

The tests have indicated, however, that the 100 to 1 flow ratio is more accurately maintained when between sixteen and twenty water orifices are connected in parallel and sixteen orifices of the same diameter are connected in series within the medicament orifice system.

This would indicate that the volume of flow through each of the water orifices 48 exceeds the flow through the series connected medicament orifices by five to six and one quarter times. It is believed that the discrepancy from the theoretical values may result from the fact that the orifices 48 are longer than the orifices 59 and 63 and/or may result from a turbulent condition occuring in the chambers 71 which exist between each of the orifices 59 and the orifice 59 downstream therefrom. In any event each of the orifices 48 of the water orifice system has a hydrodynamic equivalent value or flow rate of a substantial multiple of the hydrodynamic equivalent value of the medicament orifice system.

It is believed that the inaccuracies of metering at low flow rates when mixing liquids of significantly different specific gravity obtained with the structure of the Purdy U.S. Pat. No. 3,809,291 supra may result in part from the fact that orifices tend to exhibit non-linear metering at very low flows. In such system in which there are one hundred water metering orifices connected in parallel the flow through each orifice can become extremely small when the total flow from the proportioner is low.

Additionally, it may be possible that the flexible bag system utilized to equal the pressures may not function perfectly in the mathematical sense to cause the medicament to be at exactly the same pressure at the medicament orifice as the pressure of the water at the water orifices. Referring to FIG. 1, it should be noted that the water level 72 within the water chamber 28 is slightly higher than the medicament level 73 within the filler tube 24 when the specific gravity of the medicament is higher than the specific gravity of water. The difference between these two levels is directly proportional to the difference in the specific gravity in the two liquids with the level of the denser liquid being the lower of the two levels. Generally, the difference in level is such that the height of one column of liquid times its density is equal to the height of the other column times its density. However, when significantly different densities are involved, it may be that the flexible bag system does not provide exact equality of pressure, in the mathematical sense at the orifices, and any difference in pressures which might exist may become significant under conditions of extremely low flow.

The use of a stack of orifices or series connected medicament orifices is desirable since each of the medicament orifices is sufficiently large to prevent any material likelihood of any one of them from becoming plugged by a small particle of dirt or other foreign matter. Further, reduction in the number of water orifices produces a corresponding increase in flow through each orifice for a given total flow through the proportioner and causes each of the orifices to operate in a realm of higher flow where greater accuracy is achieved.

The ball valve 51 functions to prevent excessive concentrations of medicament from building up when there is no demand on the proportioner for a period of time. It has been found that if the specific gravity of the medicament is significantly higher than the specific gravity of water and a period of no flow exists, the medicament will continue to flow into the mixing chamber and displace water back up into the water chamber if it were not for the valve 51 to prevent such occurrence. When a condition of no demand exists on the proportioner the ball valve 51 floats up along the valve guide and seats against the exit end of the orifice 58 to prevent flow in either direction through the medicament orifice system. This is the position of the ball valve 51 illustrated in the phantom outline. In the illustrated structure, the ball is preferably formed of a material having a specific gravity lower than one so that it can float up into the closed position when no flow exists. It has been found that a polyethelene ball having a density of about 0.93 and a diameter of about one inch properly functions to prevent medicament flow through the medicament orifice system under no demand conditions on the proportioner.

However, it is necessary to cause the ball to move to the open position even under very low flow conditions. The illustrated structure provides a simple means for causing the ball 51 to move to its open fully opened position in response to even very low proportioner flow. The ball 51 is sized to closely fit the inner wall of the tubular valve guide 19 at its horizontal diameter which is located below the ports 49. Consequently, as flow is commenced through the water orifices 48, the total water flow is available to overcome the buoyancy of the ball valve 51 and move it down to its fully open position to re-establish proper proportioning flow from the two chambers 27 and 28 even when the total flow from the proportioner is small. During tests it was found that the valve opened to provide proportioning flow at total flow rates as low as two to three ounces per minute.

During normal flow while the ball 51 is in the open position, the water flows from the intermediate chamber 47 into the interior of the tubular valve guide through the ports 49 where mixing of the water and the medicament occurs. in the illustrated embodiment the total flow then continues down along the valve guide and out through a second series of ports 74 formed in the valve guide into the chamber 76 which is open to the proportioner outlet 77. A cross pin 78 is mounted across the valve guide 19 to prevent the ball valve 51 from moving to any position below the normally open position illustrated.

Because the water flows inwardly through the ports 49 toward the stream of medicament flowing out of the orifice 58, good mixing is assured and in the illustrated embodiment the chamber 77 within the valve guide above the ball valve 51 may be considered along with the chamber 76 as a mixing chamber of the proportioner.

With the illustrated embodiment of this invention a structurally simple system is provided to accurately proportion two liquids even when relatively low flow rates are required and the specific gravity of the two liquids significantly differ. In practice each of the orifices is sufficiently large to minimize the likelihood of an orifice blockage caused by particles which may exist in the liquids, or from any other cause. The tube 53 which houses a stack of orifices constituting the medicament orifice system serves a dual purpose in that it also guides the lower end of the filler tube and insures that the filler tube is properly located to terminate medicament flow in the event that the water supply is depleted for any reason. Further, the ball valve insures that excessive concentrations do not occur in the event that the demand on the proportioner is terminated for any period of time. Such ball valve, however, opens in response to the flow of water even when the total flow is relatively small.

Although a preferred embodiment of this invention is illustrated it is to be understood that various modifications and rearrangements may be resorted to without departing from the scope of the invention disclosed and claimed.

What is claimed is:

1. A proportioner for mixing two liquids in a first substantially predetermined ratio over a substantial range of flow rates comprising first and second separate chambers each adapted to contain one of said two liquids, means adapted to maintain said liquids in said first and second chambers at substantially the same pressure, a mixing chamber maintained at a pressure lower than the pressure in said first and second chambers when said proportioner is operating, a first orifice system including a plurality of first orifices connected in parallel between said first chamber and said mixing chamber, a second orifice system including a plurality of second orifices connected in series between said second chamber and said mixing chamber, each of said first orifices having a hydrodynamic equivalent value which is greater than the hydrodynamic equivalent value of the said second orifice system by a positive ratio, the number of said first orifices times each of their positive ratios equaling said first predetermined ratio, the number of said first orifices divided by one being substantially less than said first predetermined ratio, said proportioner including an orifice assembly having an orifice plate and a tubular portion, said first orifices being formed in said orifice plate and a plurality of said second orifices being mounted in said tubular portion, said tubular portion being centrally located within said proportioner, a vertically extending filler tube being provided to allow addition of liquid to said second chamber, said filler tube being provided with a cylindrical end telescoping over said tubular portion and laterally locating said tubular end while allowing vertical movement of said filler tube.

2. A proportioner as set forth in claim 1 wherein said second orifices have a diameter at least substantially equal to the diameter of at least some of said first orifices.

3. A proportioner as set forth in claim 1 wherein said first and second orifices have substantially the same diameter.

4. A proportioner as set forth in claim 1 wherein each of said first orifices has a hydrodynamic equivalent value greater than the hydrodynamic equivalent value of said second system by a second predetermined ratio, and the number of said first orifices times said second predetermined ratio equals said first predetermined ratio.

5. A proportioner as set forth in claim 1 wherein some of said second orifices are formed in discs mounted in a stack within said tubular portion.

6. A proportioner as set forth in claim 5 wherein said second orifices are separated by chambers.

7. A proportioner as set forth in claim 6 wherein substantially all of said second orifices are offset from the adjacent of said second orifices.

8. A proportioner as set forth in claim 1 wherein said proportioner includes valve means operable to close said second orifice system when there is substantially no demand for flow on said proportioner.

9. A proportioner as set forth in claim 8 wherein said valve means is opened in response to flow through said first orifice system.

10. A proportioner as set forth in claim 1 wherein the diameter of all of said orifices are substantially equal.

11. A proportioner as set forth in claim 10 wherein said liquids have different specific gravities, and said proportioner operates with substantially said first predetermined ratio at low flow rates.

12. A liquid proportioner for mixing two liquids in a predetermined ratio comprising first and second separate chambers each adapted to contain one of said two liquids, means operable to maintain said liquids in said first and second chambers at substantially the same pressure, a mixing chamber, first orifice means connecting said first chamber and said mixing chamber, separate second orifice means connecting said second chamber and said mixing chamber, said first and second orifice means operating when the pressure in said mixing chamber is lower than the pressure in said first and second chambers to continuously deliver said two liquids to said mixing chamber in substantially said predetermined ratio, a first valve means preventing flow from said second orifice means in response to an insufficient supply of liquid in said first chamber, and normally closed second valve means operable when said mixing chamber contains liquid to close said second orifice means in response to substantially no flow through said first orifice means, said second valve means being opened in response to flow through said first orifice means to permit flow through said second orifice means.

13. A liquid proportioner as set forth in claim 12 wherein said second valve means includes a valve member which is buoyant in said liquids and tends to float to said closed position.

14. A liquid proportioner as set forth in claim 13 wherein said second orifice means includes a plurality of orifices connected in series and said valve member operates when in its closed position to close off one of said series connected orifices.

15. A liquid proportioner as set forth in claim 13 wherein said second orifice means includes a plurality of orifices connected in series, and said valve member operates when in its closed position to close off the most downstream orifice of said series connected orifices.

16. A liquid proportioner as set forth in claim 15 wherein said first valve means is operable to close off the most upstream of said series connected orifices when insufficient liquid is contained in said first chamber.

17. A liquid proportioner as set forth in claim 13 wherein said proportioner provides an intermediate chamber, said first orifice means connect between said first chamber and said intermediate chamber, and said intermediate chamber is connected to said mixing chamber hydraulically above said valve member.

18. A liquid proportioner for mixing two liquids in a predetermined ratio comprising first and second separate chambers each adapted to contain one of said two liquids, means operable to maintain said liquids in said first and second chambers at substantially the same pressure, a mixing chamber, first orifice means connecting said first chamber and said mixing chamber, separte second orifice means connecting said second chamber and said mixing chamber, said first and second orifice means operating when the pressure in said mixing chamber is lower than the pressure in said first and second chambers to deliver said two liquids to said mixing chamber in substantially said predetermined ratio, said mixing chamber including a conduit aligned with said second orifice means through which liquid flows from both of said orifice means, and a float valve closely fitting said conduit closing said second orifice means when substantially no flow passes through said conduit and opening said second orifice means in response to flow through said conduit.

19. A proportioner as set forth in claim 18 wherein said conduit includes first lateral openings communicating with said first orifice means above said float valve when said float valve closes said second orifice means and second lateral openings open to said conduit below said float valve when said float valve closes said second orifice means and above said float valve when said float valve opens in response to flow through said conduit.

20. A liquid proportioner for mixing two liquids in a predetermined ratio comprising first and second separate chambers each adapted to contain one of said two liquids, means operable to maintain said liquids in said first and second chambers at substantially the same pressure, a mixing chamber, an orifice assembly positioned between said mixing chamber and said first and second chambers, said orifice assembly including a horizontally extending orifice plate, an upwardly extending tubular portion on said orifice plate and co-axial downwardly extending portion on said orifice plate, said orifice assembly also providing an intermediate chamber below said orifice plate, a plurality of first orifices in said orifice plate connecting said first chamber and said intermediate chamber, a plurality of series connected orifices in said upwardly extending tubular portion connecting said second chamber and said mixing chamber, a ball valve having a specific gravity less than the specific gravity of either of said liquids closely fitting said downwardly extending tubular projection and operable to prevent flow through said second orifices when there is substantially no demand for flow through said proportioner, said intermediate chamber being connected to said mixing chamber at a location hydraulically above said ball valve when said ball valve is in said closed position whereby said ball valve is moved to an open position in response to low flow rates through said first orifices.

* * * * *